(12) United States Patent
Saykally et al.

(10) Patent No.: US 10,404,193 B1
(45) Date of Patent: Sep. 3, 2019

(54) THERMALLY DRIVEN ELECTROKINETIC ENERGY CONVERSION WITH LIQUID WATER MICROJECTS

(71) Applicant: Energy, United States Department of, Washington, DC (US)

(72) Inventors: Richard J Saykally, Piedmont, CA (US); Stephen J Harris, Walnut Creek, CA (US)

(73) Assignee: U.S. Department of Energy, Washington, DC (US)

(*) Notice: Subject to any disclaimer, the term of this patent is extended or adjusted under 35 U.S.C. 154(b) by 597 days.

(21) Appl. No.: 15/161,761

(22) Filed: May 23, 2016

Related U.S. Application Data

(60) Provisional application No. 62/165,100, filed on May 21, 2015.

(51) Int. Cl.
| | |
|---|---|
| *B05B 1/24* | (2006.01) |
| *C25B 1/04* | (2006.01) |
| *C25B 9/06* | (2006.01) |
| *H02N 11/00* | (2006.01) |

(52) U.S. Cl.
CPC ............. *H02N 11/002* (2013.01); *B05B 1/24* (2013.01); *C25B 1/04* (2013.01); *C25B 9/06* (2013.01)

(58) Field of Classification Search
CPC ........... B01B 1/24; B01B 5/24; H01N 11/002; C25B 1/04; C25B 9/06
USPC .............. 205/628–639; 423/644; 204/157.52
See application file for complete search history.

(56) References Cited

U.S. PATENT DOCUMENTS

| | | | |
|---|---|---|---|
| 2010/0101934 A1* | 4/2010 | Saykally | C01B 3/08 204/157.52 |
| 2010/0243753 A1* | 9/2010 | Doak | B05B 7/0475 239/11 |
| 2011/0224463 A1* | 9/2011 | Zikeli | B01J 19/0093 568/940 |
| 2013/0308756 A1* | 11/2013 | Bogan | H01J 49/0431 378/86 |
| 2014/0035975 A1* | 2/2014 | Essien | B41J 2/07 347/6 |

* cited by examiner

*Primary Examiner* — Nicholas A Smith
(74) *Attorney, Agent, or Firm* — Timothy L. Hamey; Daniel Park; Brian J. Lally

(57) ABSTRACT

Embodiments relate to materials, methods to prepare, and methods of use of a thermal electrokinetic microjet apparatus. The electrokinetic microjet apparatus includes a reservoir; a jet assembly fluidly communicating with at least the reservoir; and a target electrode spaced from at least the jet assembly.

17 Claims, 3 Drawing Sheets

THERMALLY DRIVEN ELECTROKINETIC
ENERGY CONVERSION WITH LIQUID
WATER MICROJECTS

CROSS-REFERENCE TO RELATED
APPLICATIONS

This non-provisional patent application is related to and claims priority from U.S. Provisional Patent Application No. 62/165,100 filed May 21, 2015, the complete subject matter of which is incorporated herein by reference.

STATEMENT OF GOVERNMENT SUPPORT

The United States Government has rights in this invention pursuant to DOE Contract No. DE-AC02-05CH11231 between the U.S. Department of Energy and the University of California, as operator of Lawrence Berkeley National Laboratory.

FIELD OF THE INVENTION

One or more embodiments consistent with the present disclosure relate to using electrokinetic phenomena to generate electrical power. More particularly, the invention relates both a method and apparatus for the generation of hydrogen gases by flowing a liquid such as water through one or more orifices under hydrostatic pressure forming charged liquid microjets, which jets upon collision with a target acting as a source of electrons results in the production of hydrogen gas. Also, via the microjet formation process, a streaming current is produced which may be converted into useable electric power.

BACKGROUND

As described in the 2014 US DOE Report "The Water-Energy Nexus: Challenges and Opportunities", cooling of thermoelectric power plants accounts for 40% of US freshwater usage and dissipates tremendous quantities (27 quads/year) of primary energy as waste heat due to fundamental inefficiencies in converting thermal energy to electricity; internal combustion engines generate similarly prodigious amounts of waste heat (21.3 quads/year). Devices for mitigating this energy loss employing thermoelectric conversion schemes (i.e. solid-state thermoelectric generators and thermophotovoltaics) exist, but typically require high operating temperatures. An interesting alternative is to exploit the large coefficient of thermal expansion of liquid water to utilize waste heat via the production of high hydrostatic pressures, which can, in turn, drive recently demonstrated electrokinetic energy conversion and hydrogen production processes in fast-flowing liquid microjets.

Electrokinetic conversion of mechanical energy with liquid microjets and nanojets comprises a potentially important, but largely unexplored technology. There have been numerous studies on producing electrokinetic currents by forcing water through both porous materials and/or individual channels. Typically, these experiments generate streaming currents by moving liquid from one reservoir to another through a porous membrane or a single channel by applying pressure to a single side. The direct connection between the two reservoirs introduces significant inefficiencies in the energy conversion due to back-conduction through the liquid. Such inefficiencies are eliminated when liquid jets are employed. Preliminary studies have demonstrated that over 10% of the kinetic energy in a flowing water microjet may be converted into electricity and have shown that the electrical energy production can be accompanied by simultaneous gaseous hydrogen generation. Related U.S. Pat. No. 8,372,374 B2 to Saykally et al, incorporated herein by reference, discloses a device design for converting the kinetic energy in a flowing water microjet into electricity and have shown that the electrical energy production can be accompanied by simultaneous gaseous hydrogen generation. Using a similar system to drive a droplet beam into a region of high electric field, up to 48% efficiency has been reported for in the conversion of the liquid's kinetic energy to potential energy. Additionally, systems and methods are disclosed in a journal article by Lam et al. entitled "Thermally Driven Electrokinetic Energy Conversion with Liquid Water Microjets" incorporated herein by reference in its entirety.

High pressures (>500 PSI) are required to force water through the microjets and generating these pressures may substantially reduce the "wall plug" efficiency. One or more embodiments described herein address this problem by generating such pressures by exploiting water's relatively large thermal expansion coefficient and moderate bulk modulus. For example, by heating the water to very modest temperatures (e.g. 40° C.) in a steel chamber, pressures of about 1200 PSI (about 60 PSI/° C.) may be achieved.

SUMMARY

One or more of the embodiments described herein related to materials, methods to prepare, and methods of use of a thermal electrokinetic microjet apparatus. The electrokinetic microjet apparatus includes a reservoir; a jet assembly fluidly communicating with at least the reservoir; and a target electrode spaced from at least the jet assembly.

Still another embodiment relates to a thermal electrokinetic microjet apparatus, comprising a reservoir; a jet assembly fluidly communicating with at least the reservoir, the liquid microjet including at least one capillary having a 30 μm inner diameter and producing a charged liquid beam; and a target electrode spaced about 5 cm from at least the jet assembly, wherein the charged liquid beam travels about 5 cm in ambient air at an average linear flow velocity of about 20 m/s.

Still another embodiment relates to a method of performing electrokinetic conversion using mechanical energy. The microjet apparatus comprises a reservoir containing a liquid; a jet assembly fluidly communicating with at least the reservoir, the liquid microjet including at least one capillary having a 30 μm inner diameter; and a target electrode spaced about 5 cm from at least the jet assembly. The method comprises receiving the liquid from the reservoir; producing a charged liquid beam from the microjet; and striking the target at an average linear flow velocity of about 20 m/s.

BRIEF DESCRIPTION OF THE DRAWINGS

These and other features, aspects, and advantages of the multiple embodiments of the present invention will become better understood with reference to the following description, appended claims, and accompanied drawings where:

DETAILED DESCRIPTION

Figure 1:
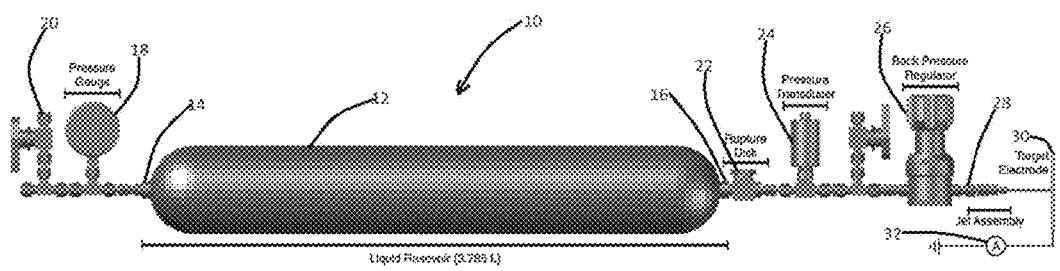
FIG. 1 illustrates a schematic of a thermal electrokinetic microjet apparatus in accordance with one embodiment of the present invention.

The following description is provided to enable any person skilled in the art to use the invention and sets forth the best mode contemplated by the inventor for carrying out the invention. As previously noted, the method and apparatus of this invention concurrently produces a streaming current which may be converted into useful electrical energy. Various modifications, however, will remain readily apparent to those skilled in the art, since the principles of the present invention are defined herein specifically to provide embodiments relating to using electrokinetic phenomena to generate electrical power.

It is contemplated that electrokinetic power stations may be used to supply or supplement power to buildings and devices. Additionally, hydrogen fuel cells may be employed that use the hydrogen co-produced with the electricity. High pressures are required to drive water through the nanojets, but such pressures (about 60 PSI/° C.) can be obtained "for free" (from waste heat sources) by taking advantage of water's large thermal expansion coefficient and heating it in a rigid (e.g. metal) chamber with solar energy or with waste heat. In this way, electrokinetic jets can work in tandem with more conventional thermoelectric devices, which typically require much higher temperatures for good efficiency.

High pressures (>500 PSI) are required to force water through the microjets and generate such pressures, substantially reducing the "wall plug" efficiency evident in prior art designs. One or more embodiments described herein address this problem by demonstrating that such pressures can easily be generated by exploiting water's relatively large thermal expansion coefficient and moderate bulk modulus. For example, by heating the water to very modest temperatures (e.g. 40° C.) in a steel chamber, pressures of about 1200 PSI (about 60 PSI/C) may be generated. Practical devices and methods are disclosed herein that can produce useful amounts of electricity while simultaneously generating hydrogen gas from flowing water, using simple passive thermal sources to produce the requisite high water pressures.

Previous methods have produced electrokinetic currents by forcing water through both porous materials and individual channels. The electrokinetic streaming current originates from the overlap between the liquid flow profile and the charge distribution near the solid-liquid interface. The streaming current (Is) generated by a circular channel can be described by the integral of the product of the velocity profile v(r), and the charge density distribution, ρ(r) as described below in Equation (1):

$$Is = 2\pi R \int_0^R v(r)\rho(r)dr \qquad \text{Equation (1)}$$

where R represents the channel radius and r represents the distance from the channel wall. Typically, these methods generate streaming currents by moving liquid from one reservoir to another through a porous membrane or a single channel by applying pressure to one reservoir. It should be appreciated that the direct connection between the two reservoirs introduces significant inefficiencies in the energy conversion due to back-conduction through the liquid.

More recent methods produce water droplets that jump between hydrophobic and hydrophilic surfaces, attaining a positive electrostatic charge and generating electrical power via a similar charge separation mechanism. The inefficiencies resulting from back-conduction through the liquid in the reservoir systems are eliminated when such liquid jets are employed. Under the laminar flow conditions in this method, the streaming current can be described by Equation (2):

$$I_s = -8\pi\varepsilon_0 K v \zeta \qquad \text{Equation (2)}$$

where $\varepsilon_0$ represents the permittivity of free space, K is the dielectric constant of the liquid, v represents the area-averaged flow velocity, and $\zeta$ represents the zeta-potential.

Preliminary studies of the above-described liquid jet systems demonstrate a conversion efficiency >10% with a peak power of about 6 mW in water flowing from a 10 μm inner diameter aperture under turbulent flow conditions. These preliminary studies have shown that the electrical energy production can be accompanied by simultaneous gaseous hydrogen generation. Here, electrical efficiency (η) is calculated as electrical power divided by the input kinetic energy as a function of volumetric flow rate (Q) and the applied pressure differential (ΔP) as described below in Equation (3):

$$\eta = \frac{Is2RL}{Q\Delta P} \qquad \text{Equation (3)}$$

where $R_L$ represents the load resistance. It should be appreciated that in this manner, the efficiency of the system is decoupled from the efficiency of refilling and heating the cylinder which is dependent on a variety of factors (i.e. location of the water source, thermal conductivity of the reservoir, heat capacity of the reservoir, and the like). Using a similar system to drive a droplet beam into a region of high electric field, up to 48% efficiency has been reported for in the conversion of the liquid's kinetic energy to potential energy.

As provided previously, high pressures (>500 PSI) are required to force water through the microjets. Generating these pressures substantially reduces the 'wall plug' efficiency. This problem is addressed using pressures easily be generated by exploiting water's relatively large volumetric thermal expansion coefficient ($\alpha_v(20°$ C.$) = 2.07 \times 10^{-4} K_{-1}$) and moderate bulk modulus ($K_T = 3.16 \times 10^5$ PSI). The resulting pressure change (ΔP) induced by the temperature increase (ΔT) can therefore be approximated by $$\Delta P = \alpha_v K_T G \Delta T \qquad \text{Equation (4)}$$

For liquid water in a rigid container, generating pressures of about 65.41 PSI/° C. is expected. Below an apparatus is described that produces useful amounts of electricity while simultaneously generating hydrogen gas from flowing water, using simple passive thermal sources to produce the requisite high water pressures.

FIG. 1 presents a schematic of one embodiment of a thermal electrokinetic microjet apparatus of the present invention, generally designated 10. FIG. 1 depicts a reservoir 12. In at least one embodiment, reservoir 12 comprises a double ended reservoir 12 having first end 14 and second end 16. In at least one embodiment, reservoir 12 comprises a stainless steel reservoir capable of holding between 2 and 10 L, but generally 3.785 L for example. In the present embodiment, the reservoir 12 limits the maximum pressure to below about 1450 PSI.

In at least one embodiment, the reservoir 12 is filled with a liquid, deionized water for example, and fitted with a heating element such as a resistive heating tape system or other heating device (not shown) coupled to a digital AC switch (a CPS U-X3 for example) and the system pressure. The heating element is adapted to heat the water in the reservoir 12 to a very modest temperature, less than about 100° C. for example. Internal temperature measurements are collected using a T-type thermocouple inserted into the center of the reservoir 12 while the external temperature is measured using a digital temperature probe.

In one embodiment, the heating element heats the water in the reservoir 12 to about 40° C. Such modest heating produce pressures of about 1200 PSI or about 60 PSI/° C. in the reservoir 12. Below we describe the design and construction of practical devices that can produce useful amounts of electricity while simultaneously generating hydrogen gas from flowing water, using simple passive thermal sources to produce the requisite high water pressures.

FIG. 1 depicts first end 14 having pressure gauge 18 in fluid communications therewith, and a port 20 in fluid communication with pressure gauge 18. The illustrated thermal electrokinetic microjet apparatus 10 further includes a rupture disk 22 fluidly communicating with the second end 16. A pressure transducer 24 is illustrated in fluid communication with the rupture disk 22 and back pressure regulator 26. The pressure transducer 24, a digital pressure transducer such as a Heise Model DXD, provides pressure and temperature readings prior to the jet assembly 28. The microjet jet assembly 28 is shown having a target electrode 30 spaced therefrom. In the illustrated embodiment, the target electrode 30 is a copper plate although other target electrodes are contemplated.

The liquid microjet or liquid beam is produced by ejecting the pressurized water from the microjet 28. In one embodiment, microjet 28 includes a 30 μm inner diameter silica capillary. Silica capillaries were employed here rather than the Pt/Ir electron microscope apertures badue to the intrinsic chemical stability of the silica capillaries. The liquid beam travels about 5 cm in ambient air at average linear flow velocities of about 20 m/s before impinging on the target electrode 30 connected to an ammeter 32. In order to maintain a constant pressure, the temperature must slowly be increased as the liquid is expelled from the reservoir 12. The heating and liquid flow are controlled using a feedback loop which couples at least the heating element (digital AC switch, on/off), the liquid flow as a function of pressure (via back-pressure regulator 26), and the reservoir pressure. In this embodiment, the heating element is activated or deactivated when the pressure falls below 1200 PSI or rises above 1300 PSI, respectively. The back pressure regulator is set to open when the pressure rises above ~1200. The current generated is monitored within this feedback loop.

Figure 2:
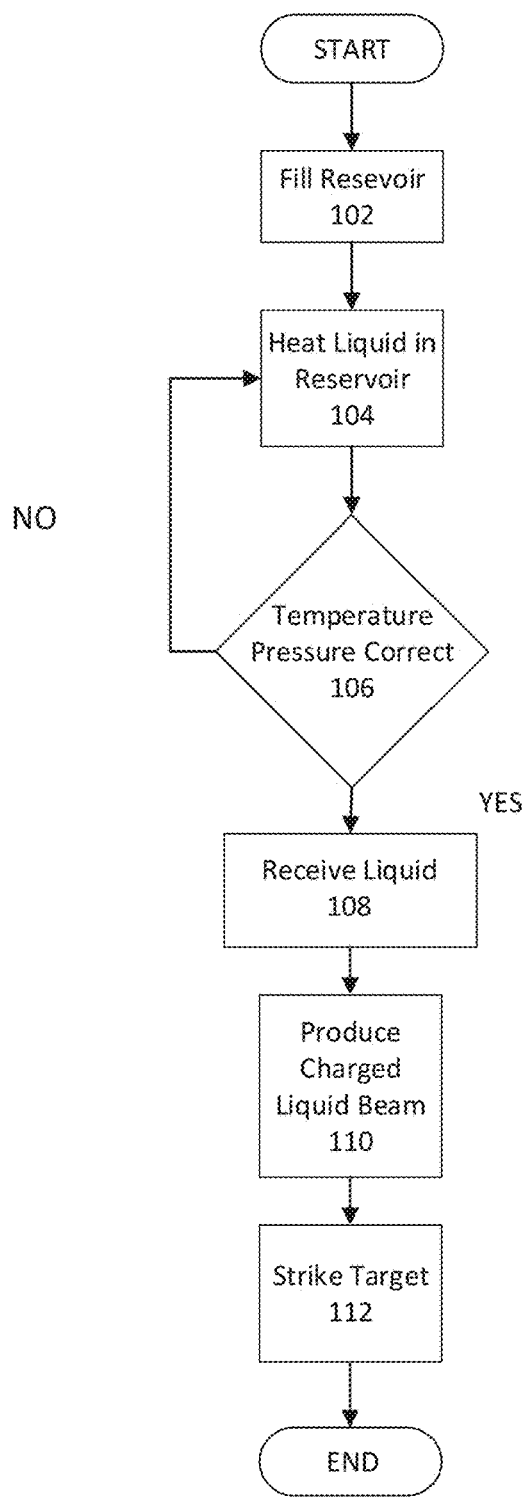
FIG. 2 illustrates a flowchart depicting a method of generating power using a thermal electrokinetic microjet apparatus in accordance with one embodiment of the present invention.

FIG. 2 illustrates a flow chart depicting a method of performing electrokinetic conversion, generally designated 100, for producing electricity using any of the microjet apparatus disclosed herein. Embodiments of the method 100 exploit the electrokinetic charge separation phenomenon. The input energy is a hydrostatic pressure source, and the hydrogen is produced by potential-driven reduction of water enriched in protons. Proton enriched water is obtained via the electrical charge separation effected by rapid flow of liquid water through a metal orifice. The electrokinetic charge separation process also generates electrical currents, which can be harnessed for, among other things, further electrochemical water splitting, and/or power generation.

Method 100 further includes determining if the temperature and/or pressure are correct, block 106. The heating and liquid flow is controlled using a feedback loop which couples the heating element, the liquid flow as a function of pressure, and the reservoir pressure with some means of control. In method 100, the heating element is activated or deactivated when the pressure falls below about 1200 PSI or rises above about 1300 PSI, respectively. The back pressure regulator 26 is set to open when the pressure rises above about 1200 PSI. The current generated is monitored within this feedback loop. Internal temperature measurements are collected using a T-type thermocouple inserted into the center of the reservoir 12. The external temperature is measured using a digital temperature probe.

If the temperature and pressure are correct, method 100 further includes receiving the liquid at the microjet for example, block 108. The microjet produces a charged liquid beam, block 110. In at least one embodiment, the orifice in the microjet produces an electrically charged liquid beam. The liquid beam strikes a target, block 112, releasing hydrogen, and generating a current.

Figures 3A, 3B, 3C:
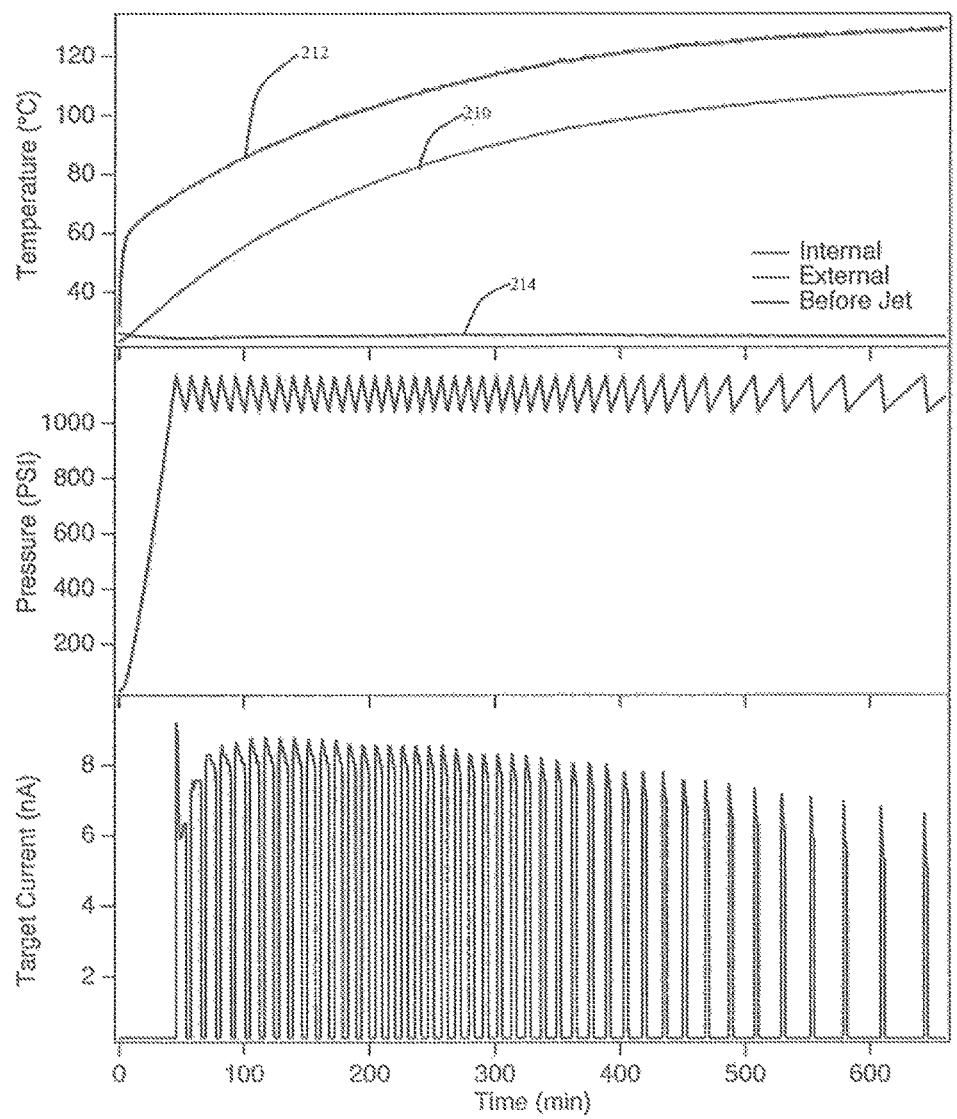
FIG. 3A illustrates a graph depicting temperature generated using an electrokinetic microjet apparatus and method in accordance with the present invention.
FIG. 3B illustrates a graph depicting pressure generated using an electrokinetic microjet apparatus and method in accordance with the present invention.
FIG. 3C illustrates a graph depicting current generated using an electrokinetic microjet apparatus and method in accordance with the present invention.

FIG. 3A-3C depicts the temperature, pressure, and current measured for an individual experiment. FIG. 3A depicts the temperature monitored in three different locations on the cylinder—internal temperature (line 210), external temperature (line 212), and the temperature behind the silica capillary (line 214). During typical operation of the apparatus, the initial liquid temperature is about 25° C. and ultimately reaches temperatures of above 100° C. The pressure generated from the heating is shown in FIG. 3B. The sample cylinder is initially filled with water at a backing pressure of about 30-35 PSI and is allowed to reach a maximum of about 1350 PSI. The initial pressurization, defined as the time required to reach 1200 PSI, typically takes about 50 minutes and requires a temperature change of about 20-30° C. FIG. 3C illustrates the current generated by the system as a function of time for a single experiment. The on/off behavior of the generated current is a direct result of the opening and closing of the back pressure regulator.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A thermal electrokinetic microjet apparatus, comprising:
    a reservoir including at least one heating device;
    a jet assembly fluidly communicating with at least the reservoir; and
    a target electrode spaced from at least the jet assembly.

2. The thermal electrokinetic microjet apparatus of claim 1 wherein the target electrode is spaced about 5 cm from the jet assembly.

3. The thermal electrokinetic microjet apparatus of claim 1 wherein the jet assembly produces a charged liquid beam.

4. The thermal electrokinetic microjet apparatus of claim 3 wherein the liquid beam travels about 5 cm in ambient air at an average linear flow velocity of about 20 m/s.

5. The thermal electrokinetic microjet apparatus of claim 1 wherein the target is a copper plate.

6. The thermal electrokinetic microjet apparatus of claim 1 further including a rupture disk fluidly communicating with at least the reservoir.

7. The thermal electrokinetic microjet apparatus of claim 6 further including a pressure transducer fluidly communicating with at least the rupture disk.

8. The thermal electrokinetic microjet apparatus of claim 7 further including a back pressure regulator fluidly communicating with the pressure transducer and the jet assembly.

9. The thermal electrokinetic microjet apparatus of claim 1 wherein the liquid microjet comprises at least one capillary having a 30 µm inner diameter.

10. The thermal electrokinetic microjet apparatus of claim 9 wherein the at least one capillary is a 30 µm inner diameter silica capillary.

11. The thermal electrokinetic microjet apparatus of claim 1 wherein the reservoir comprise a double-ended cylinder adapted to hold deionized water.

12. A thermal electrokinetic microjet apparatus, comprising:
    a reservoir including at least one heating device;
    a jet assembly fluidly communicating with at least the reservoir, the liquid microjet including at least one capillary having a 30 µm inner diameter and producing a charged liquid beam; and
    a target electrode spaced about 5 cm from at least the jet assembly, wherein the charged liquid beam travels about 5 cm in ambient air at an average linear flow velocity of about 20 m/s.

13. The thermal electrokinetic microjet apparatus of claim 12 wherein the at least one capillary is a 30 µm inner diameter silica capillary.

14. The thermal electrokinetic microjet apparatus of claim 13 wherein the reservoir comprises a double-ended cylinder adapted to hold deionized water.

15. A method of performing electrokinetic conversion using mechanical energy, comprising:
    providing a microjet apparatus comprising:
        a reservoir including at least one heating element and containing a liquid;
        a jet assembly fluidly communicating with at least the reservoir, the liquid microjet including at least one capillary having a 30 µm inner diameter; and
        a target electrode spaced about 5 cm from at least the jet assembly;
    receiving the liquid from the reservoir;
    producing a charged liquid beam from the microjet; and
    striking the target at an average linear flow velocity of about 20 m/s.

16. The method of claim 15 further comprising heating the liquid to about 40° C., producing pressures of about 60 PSI/° C.

17. The method of claim 16 wherein the liquid comprises water.

* * * * *